No. 693,824. Patented Feb. 25, 1902.
H. W. BOLENS.
SEAT SPIDER.
(Application filed Mar. 14, 1901.)
(No Model.)
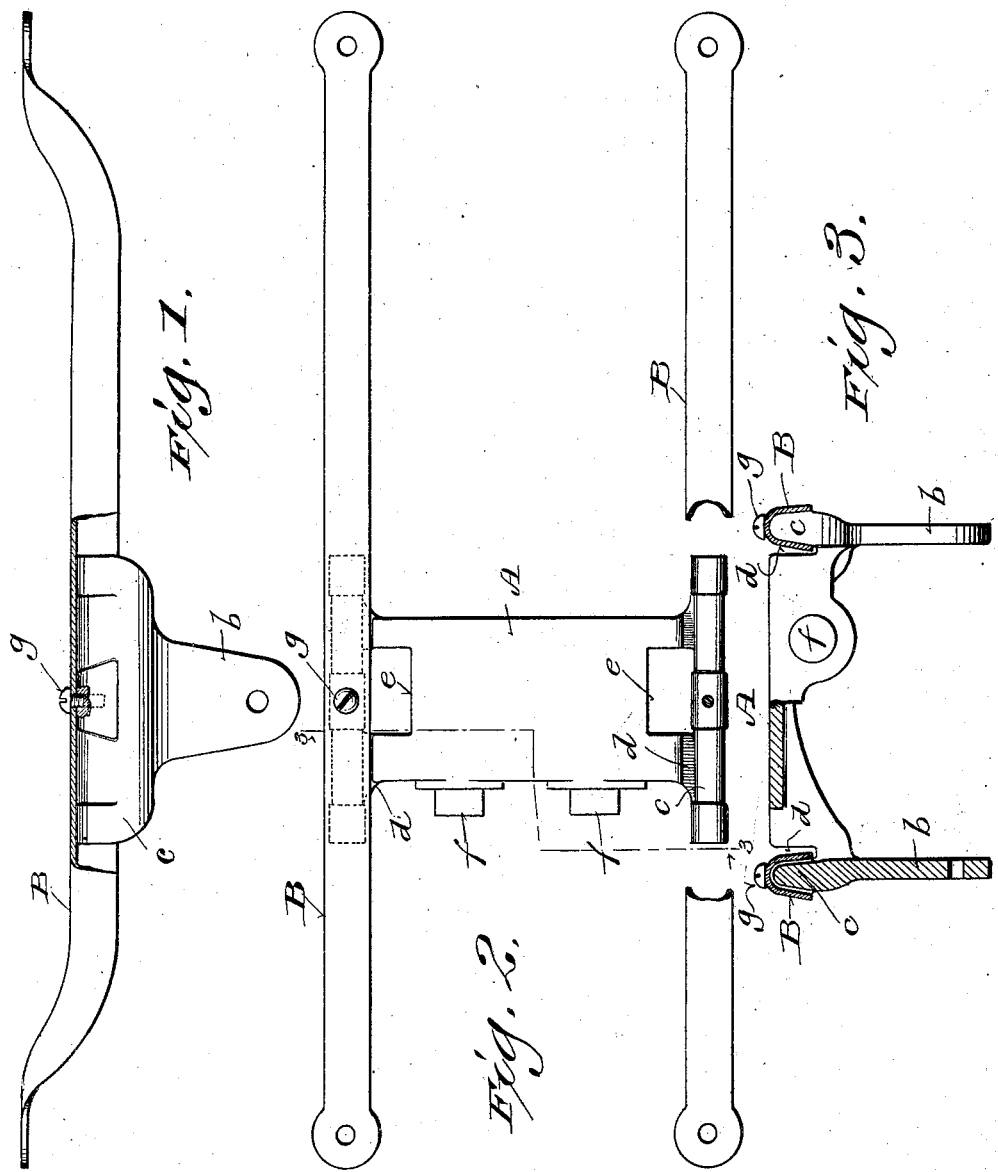
Witnesses:
Geo. W. Young
N. E. Oliphant
Inventor
Harry W. Bolens,
By H. G. Underwood
Attorney

UNITED STATES PATENT OFFICE.

HARRY W. BOLENS, OF PORT WASHINGTON, WISCONSIN.

SEAT-SPIDER.

SPECIFICATION forming part of Letters Patent No. 693,824, dated February 25, 1902.

Application filed March 14, 1901. Serial No. 51,092. (No model.)

*To all whom it may concern:*

Be it known that I, HARRY W. BOLENS, a citizen of the United States, and a resident of Port Washington, in the county of Ozaukee and State of Wisconsin, have invented certain new and useful Improvements in Seat-Spiders; and I do hereby declare that the following is a full, clear, and exact description thereof.

My invention has for its object to provide the chair and stool trade with economical spiders of the kind comprising sheet-metal spider-arms made fast to spreaders and attachable at their ends to seats, said invention consisting in certain peculiarities of construction and combination of parts hereinafter particularly set forth, with reference to the accompanying drawings, and subsequently claimed.

Figure 1 of the drawings represents a partly-sectional side elevation of a tilt-seat spider made in accordance with my invention; Fig. 2, a plan view of the spider having one of the arms thereof partly broken away; and Fig. 3, a transverse sectional view of said spider, this view being indicated by lines 3 3 in the second figure of the series.

Referring by letter to the drawings, A indicates a transverse spreader provided with depending pivot-ears b, and B each of a pair of parallel spider-arms made independent of each other and the spreader, but fastened to said spreader in practice, this assemblage of parts constituting a seat-spider in accordance with my invention. The ends of the spreader are provided with elongated ribs or shoulders c, that constitute the outer walls of transverse grooves d, formed between the body of the spreader and shoulders. The said grooves and shoulders may be interrupted by play-slots e for stop-ears (not shown) of an ordinary tilt-seat standard. The spreader A is also provided at one side with the usual supporting-lugs f for spiral tension-springs commonly employed in conjunction with tilt-seat spiders, and the end shoulders c of said spreader, being extended beyond the body portion of the spider, are preferably longer than the adjacent grooves d, their arrangement being such that they extend beyond the extremities of said grooves.

The spreader herein shown is a one-piece casting; but I do not wish to be understood as limiting myself to a cast-metal spreader, as it may be otherwise in some instances.

The sheet-metal arms B of the spider are preferably U-shaped or semitubular in cross-section for the greater portion of their length and are inverted on the shoulders c of spreader A, to which they are made fast, clearance for said arm being had in the grooves d of said spreader. Each arm is also horizontal for the greater portion of its length and is bent to have its ends at a greater elevation than the remainder thereof, these ends being flattened and apertured to form attaching ends for the engagement of bolts or rivets by which they are held snug against the under side of a seat.

In the present instance, the spreader being a casting, it is preferable to have the shoulders c thereof highest and thickest at their extremes and center to thereby avoid the necessity of dressing said shoulders throughout their length to insure smooth close fit of the arms B thereon, set-screws g or other suitable devices being employed to fasten said arms to the central enlargements of said shoulders.

The sheet-metal spider-arms of the spider will withstand blows, vibrations, and other causes detrimental to cast-metal arms, the spider as a whole being similar in general appearance to the ordinary cast-iron spider most familiar to the trade and more economical than the same.

While the spider herein shown and particularly described is especially designed for tilt-seat chairs, my invention is applicable to other varieties of chairs and to various kinds of stools, it being practical to vary the structural details of said spider in some particulars, according to its utility in the chair and stool trade, without departure from the essential characteristics of said invention.

Having thus described my invention, what I claim as new, and desire to secure by Letters Patent, is—

1. A seat-spider comprising a spreader the body portion of which is provided with transverse grooves and beyond the same with shoulders, the latter constituting the outer walls of the grooves, and sheet-metal spider-arms fast on the end shoulders and resting within said grooves and adapted to be attached at their ends to a seat 2. A seat-spider comprising a spreader, the body portion of which is provided with play-slots for stop-ears of a tilt-seat standard, transverse grooves interrupting the slots and end shoulders constituting outer walls of the grooves; sheet-metal spider-arms on the end shoulders and engaging the grooves, and means rigidly connecting the said spider-arms and said shoulders.

3. A seat-spider comprising a spreader the body portion of which is provided with transverse grooves and end shoulders the latter constituting outer walls of the grooves and being highest and thickest at their extremities and centers; sheet-metal spider-arms on the spreader-shoulders and engaging within the grooves, and means rigidly connecting the arms and said shoulders.

4. A seat-spider comprising a cast-metal spreader the body portion of which is provided with transverse grooves and beyond the same with end shoulders, the latter constituting the outer walls of the grooves, and sheet-metal spider-arms conforming to and secured upon the said end shoulders and at their inner sides resting in said grooves and adapted to be attached at their ends to a seat.

In testimony that I claim the foregoing I have hereunto set my hand, at Milwaukee, in the county of Milwaukee and State of Wisconsin, in the presence of two witnesses.

HARRY W. BOLENS.

Witnesses:
N. E. OLIPHANT,
B. C. ROLOFF.